US007737986B2

(12) United States Patent
Seigneret et al.

(10) Patent No.: US 7,737,986 B2
(45) Date of Patent: Jun. 15, 2010

(54) METHODS AND SYSTEMS FOR TILING VIDEO OR STILL IMAGE DATA

(75) Inventors: Franck Seigneret, Saint Jeannet (FR); Sylvain Dubois, Paris (FR); Jean Pierre Noel, Nice (FR); Pierre-Yves J. Taloud, St Ismier (FR)

(73) Assignee: Texas Instruments Incorporated, Dallas, TX (US)

( * ) Notice: Subject to any disclaimer, the term of this patent is extended or adjusted under 35 U.S.C. 154(b) by 636 days.

(21) Appl. No.: 11/617,820

(22) Filed: Dec. 29, 2006

(65) Prior Publication Data

US 2008/0055325 A1 Mar. 6, 2008

(51) Int. Cl.

| | |
|---|---|
| ***G06F 12/10*** | (2006.01) |
| ***G06F 12/00*** | (2006.01) |
| ***G06F 9/26*** | (2006.01) |
| ***G06F 9/34*** | (2006.01) |
| ***G06G 5/399*** | (2006.01) |

(52) U.S. Cl. ....................... 345/569; 345/568; 345/540; 711/202; 711/203; 711/206

(58) Field of Classification Search ................. 345/531, 345/540, 568, 569; 711/202, 203, 206
See application file for complete search history.

(56) References Cited

U.S. PATENT DOCUMENTS

| | | | | |
|---|---|---|---|---|
| 4,865,423 | A * | 9/1989 | Doi | 345/421 |
| 5,510,857 | A | 4/1996 | Kopet et al. | |
| 5,745,739 | A * | 4/1998 | Wang et al. | 345/569 |
| 6,230,235 | B1 * | 5/2001 | Lu et al. | 711/106 |
| 6,496,192 | B1 * | 12/2002 | Shreesha et al. | 345/540 |
| 6,738,861 | B2 * | 5/2004 | Lawrence | 711/106 |
| 6,741,247 | B1 * | 5/2004 | Fenney | 345/421 |
| 2003/0142102 | A1 * | 7/2003 | Emberling et al. | 345/540 |
| 2005/0041489 | A1 | 2/2005 | Nakatsuka et al. | |

* cited by examiner

*Primary Examiner*—Kee M Tung
*Assistant Examiner*—Robert Craddock
(74) *Attorney, Agent, or Firm*—Wade J. Brady, III; Frederick J. Telecky, Jr.

(57) ABSTRACT

The present disclosure describes methods and systems for tiling video or still image data. At least some preferred embodiments include a method for accessing data that includes partitioning a display of graphical data into a plurality of two-dimensional tiles; mapping a two-dimensional tile of the plurality of two-dimensional tiles to a single memory row within a memory; and maintaining the graphical data for the two-dimensional tile in the single memory row.

17 Claims, 3 Drawing Sheets

*FIG. 1C*
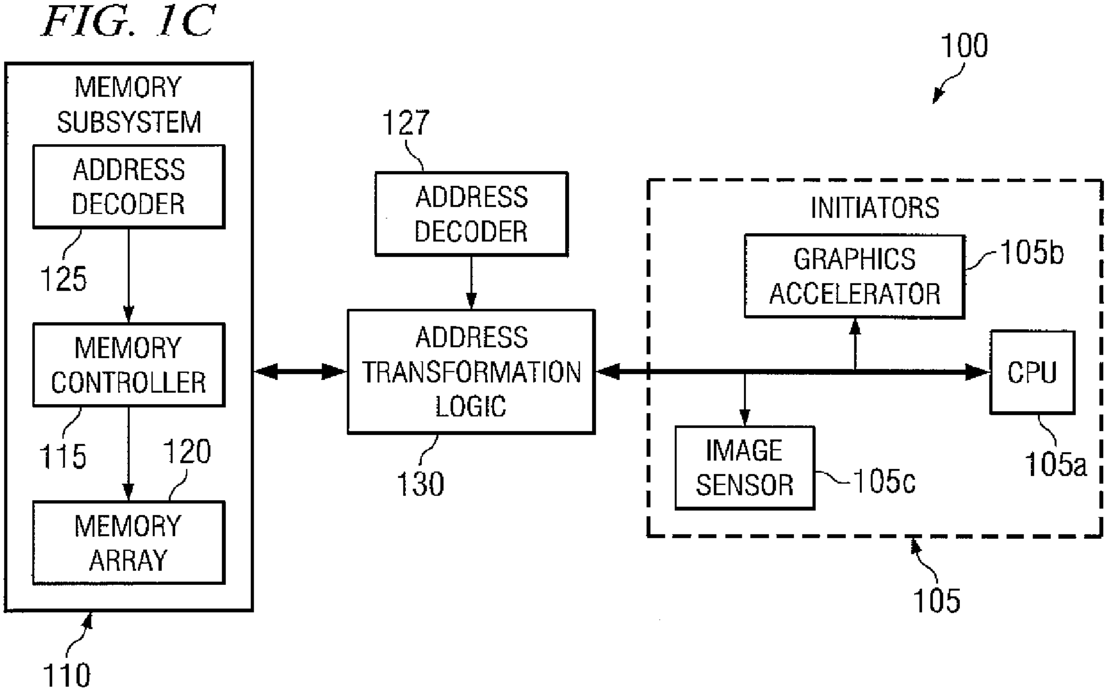
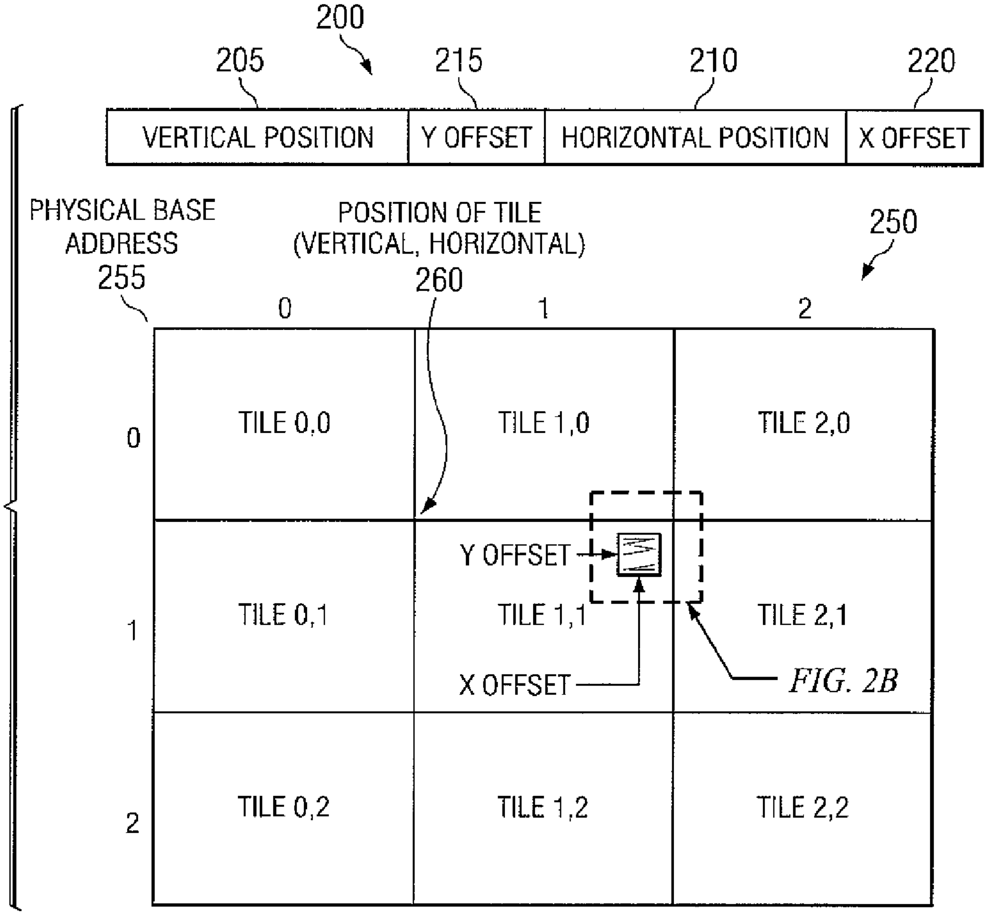
*FIG. 2A*

METHODS AND SYSTEMS FOR TILING VIDEO OR STILL IMAGE DATA

CROSS-REFERENCE TO RELATED APPLICATIONS

The present application claims priority to co-pending European Patent Office application Serial No. EP06291383.5, filed Aug. 29, 2006, and entitled "Generic Centralized Tiling Architecture for Seamless and Optimized Accesses to Video and Graphic Objects in DRAM memory," which is hereby incorporated by reference.

BACKGROUND

Modern electronic devices increasingly include the ability to deliver video or still image content to users. Battery-powered handheld electronic devices such as personal digital assistants (PDAs), portable music players, and cellular telephones frequently offer image viewing and recording capabilities, as well as video playback and recording capabilities (e.g., the ability to watch entire feature length movies or record video scenes). Because images often involve large amounts of digital data, the storage, review and playback of these images and movies on a battery-powered handheld device may present unique challenges. One such challenge involves efficient storage and retrieval of these images into and out of the dynamic random access memory (DRAM) of the device.

Computers store and playback images stored within DRAMs in digital format (i.e., as a collection of 1s and 0s), and these DRAMs are organized in rows of a predetermined size (e.g., 1024 bytes of data). The smallest portion of a digital image is the "pixel", and pixels may require one or more bytes of space in memory. For example, in a video graphics array (VGA) display mode (a standard display mode) the screen size is 480 rows of pixels by 640 columns of pixels, with 2 bytes of data per pixel. Hence, in VGA mode each pixel row requires approximately 1280 bytes, which is more than the 1024 bytes of data space available in a single DRAM row. Thus, each pixel row on the screen may span more than one DRAM row. Furthermore, because processing of objects within images spanning multiple pixel rows on a screen tends to be based on the inherent spatial locality of a set of pixels, even more full and/or partial rows may be accessed when an object is processed.

Each time a new DRAM row is accessed, an overhead price is paid in terms of memory performance and power consumption. Specifically, each time a new DRAM row is accessed, the entire DRAM row must be refreshed regardless of whether the entire row of data or only a fraction of the row of data is desired. As a result, accesses to DRAM take longer because DRAM rows must be refreshed before completing the memory operation, which reduces the overall bandwidth of the memory interface. Furthermore, each refresh operation increases the power consumption of RAM, which is a concern for battery-powered handheld devices.

In an attempt at limiting this overhead, image objects are often stored in RAM in a specific arrangement based on the distribution of accesses to the object. In video, objects that appear sequentially in time are optimally grouped in memory. These optimized storage arrangements, however, are usually specific to the hardware and software of the particular system, which makes any efficiencies gained also specific to that particular system and difficult to integrate with other optimizations, ultimately increasing the time-to-market of electronic products with image and video capabilities.

SUMMARY

The present disclosure describes methods and systems for tiling video or still image data. At least some preferred embodiments include a method for accessing data that includes partitioning a display of graphical data into a plurality of two-dimensional tiles; mapping a two-dimensional tile of the plurality of two-dimensional tiles to a single memory row within a memory; and maintaining the graphical data for the two-dimensional tile in the single memory row.

BRIEF DESCRIPTION OF THE DRAWINGS

For a detailed description of exemplary embodiments of the invention, reference will now be made to the accompanying drawings in which:

FIG. 1C depicts a computing system with address transformation logic interposed between the hardware initiators and the memory subsystem, capable of processing images and video in accordance with at least some preferred embodiments;

FIG. 2A depicts a virtual address of pixel data generated by one of the hardware initiators, in accordance with at least some preferred embodiments;

NOTATION AND NOMENCLATURE

Figure 1A:
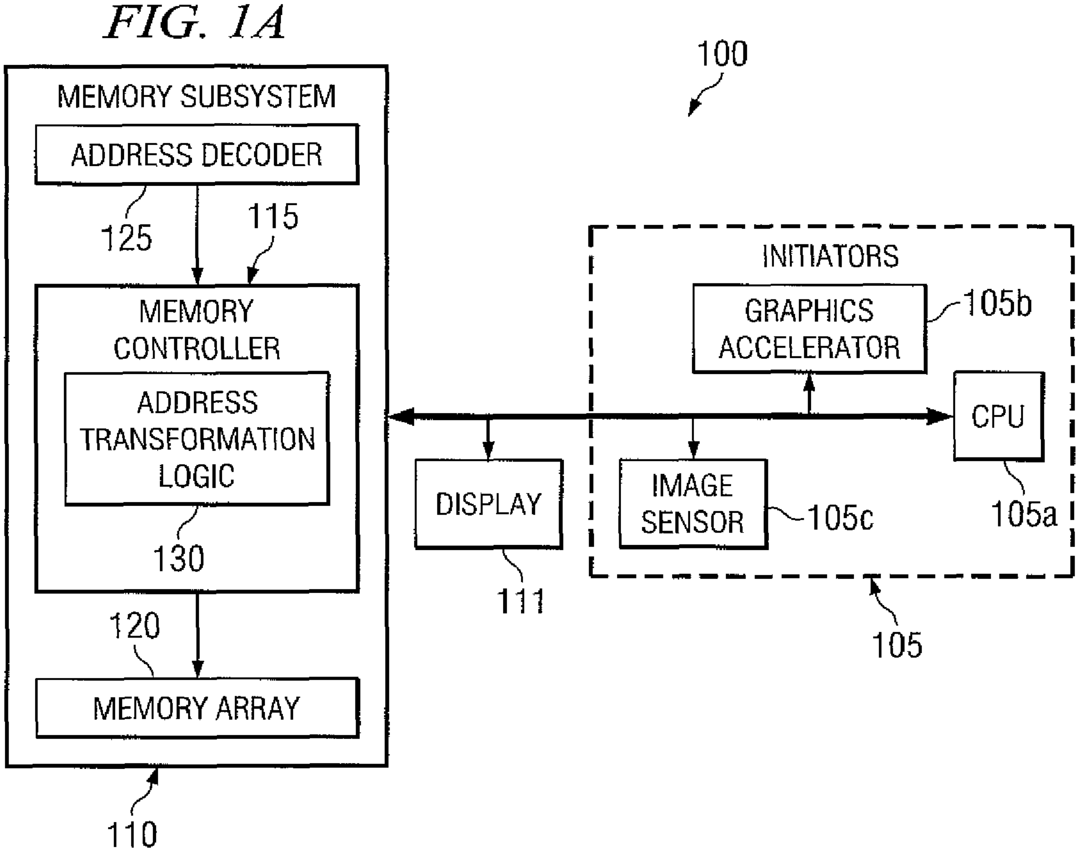
FIG. 1A depicts a computing system with address transformation logic within the memory subsystem, capable of processing images and video in accordance with at least some preferred embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "software" refers to any executable code capable of running on a processor, regardless of the media used to store the software. Thus, code stored in non-volatile memory, and sometimes referred to as "embedded firmware," is within the definition of software. Further, the term "system" refers to a collection of two or more hardware and/or software components, and may be used to refer to an electronic device, such as a computer system or a portion of a computer system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure describes systems and methods for efficiently utilizing memory in the context of compressed images and video streams. While the following embodiments are discussed with regard to a complete image and video picture application, one of ordinary skill in the art will appreciate that the embodiments are equally applicable to image and video processing subsystem applications, such as, for example, MPEG, QuickTime®, H264, and H263. Such subsystem applications may further include three-dimensional (3D) or two-dimensional (2D) graphics applications for processing video and still images that require access to a 2D frame in a raster-scan order organization and for which small 2D objects are usually accessed within that frame. All such subsystem applications are intended to be within the scope of the present disclosure.

A primary goal of image and video compression, encoding, and decoding is to represent an image with as few bits as possible. This is often done by detecting temporal and spatial redundancies in the graphical data and compressing its digital representation to reduce these redundancies. As a result, many image encoding and decoding standards involve grouping pixels of an image into two dimensional blocks that contain a predetermined number of pixels. This grouping of pixels is often performed during the image encoding process. In the case of the MPEG video encoding standard, for example, these macroblocks are sixteen pixels tall by sixteen pixels wide, composed of four, eight-by-eight sub-blocks At least some of the preferred embodiments disclosed in the present disclosure partition a display of graphical data into two-dimensional user configured quantities called “tiles,” and these tiles form the basis for determining the organization of the image data stored in memory. Since graphical data is encoded in a raster scan fashion, the tiled version of the graphical data stored in memory comprises a pattern of parallel horizontal rows of tiles. By choosing the size and shape of these tiles and implementing other features, performance improvements in memory access speed and reductions in the power consumption of the memory are possible.

FIG. 1A depicts a preferred computing system 100 capable of processing images and video data. In at least some embodiments, the components within system 100 are contained within a single integrated circuit (IC), while in other embodiments the components within system 100 are contained within separate ICs. Thus, while this disclosure may discuss embodiments of system 100 that are contained within a single IC, the claims are not intended to be limited to systems located within a single IC. System 100 comprises a plurality of hardware initiators 105 coupled to memory subsystem 110. Hardware initiators 105 include components within system 100 that initiate memory accesses (reads and/or writes) to memory subsystem 110, causing graphical data to be transferred to and from memory subsystem 110. Hardware initiators 105 of the embodiment of FIG. 1A, such as those found within at least some battery-powered portable electronic devices, include central processing unit (CPU) 105*a*, graphics accelerator 105*b*, and image sensor 105*c*. Each of the hardware initiators 105 preferably executes one or more software application programs, and interacts with the memory subsystem 110 to store and retrieve 2D objects (with variable size) within images and videos. The system 100 may also include or couple to a video display 111 that is capable of displaying uncompressed images and videos. In at least some preferred embodiments, video display 111 may also operate as an initiator.

The memory subsystem 110 comprises memory controller 115 coupled to memory array 120. In the preferred embodiment of FIG. 1A, memory controller 115 comprises address transformation logic 130. Memory array 120 is utilized to store graphical data within memory subsystem 110. The address transformation logic 130 is responsible for arranging the graphical data transferred to and from the hardware initiators into two dimensional tiles. The size of the tiles in bytes is configured based upon a “context” configured within the memory controller (described below). A context is a collection of characteristics that describe both the nature of the graphical objects processed, as well as the characteristics and organization of the memory array 120 used to store the data representing the graphical objects. Such characteristics may include the size of the graphical objects processed, the type of graphical data (e.g., still image data or video data), the resolution of the image or video, and the size and organization of the memory array, just to name a few. Depending upon the context, address transformation logic 130 may be configured to organize the data into tiles of a specific size by application software executing on an initiator. Each context thus defines a tiling organization that is optimal for a particular image and/or video, and a particular memory array organization.

In at least some embodiments, memory array 120 is arranged into sub-arrays of rows and columns of transistors that each stores a single bit. The bits from individual rows of multiple sub-arrays are further grouped into bytes and/or words that each represents a single pixel represented on display 111. Pixels are then further organized into the tiles described above, with the size of the tiles (in bytes) preferably set equal to or less than the capacity of a row within a sub-array of memory array 120. Thus, when a single data row, which is distributed over the grouped sub-arrays, is read from or written to memory array 120, pixels spanning multiple scan lines of a localized area of display 111 may be concurrently accessed. The data row in memory represents a two-dimensional area of the visual image or video displayed, rather than a single-dimensional scan line of the image or video.

For a given pixels-per-tile size, a variety of tile dimensions are possible. The dimensions of the tiles of the preferred embodiments will depend on the context defined for specific graphical data, and on the objects represented and processed. For example, if the 2D image objects accessed by a given application have horizontal dimensions that, overall, are significantly larger than the vertical dimensions of the objects, there is a higher statistical probability that the objects will be accessed in the horizontal direction than in the vertical direction. The tile dimensions may be set larger in the horizontal direction than the vertical direction to take advantage of this higher statistical probability. Similarly, if the accessed 2D objects are more likely to be accessed in the vertical direction rather than the horizontal direction (e.g., if the objects are, overall, tall and narrow), then the tile dimensions may be set larger in the vertical direction. Although the tile size and dimensions are usually set by and for a particular application being executed, the tile size and dimensions may be reconfigured to accommodate different applications concurrently. Additionally, memory array 120 may include multiple sub-arrays of different sizes and with different access distribution characteristics, each optimized for different contexts and selectable by an application executing on a particular initiator. Many different organizations and contexts will become apparent to those skilled in the art, and all such organizations and optimizations are intended to be within the scope of the present disclosure.

In the preferred embodiment of FIG. 1A, hardware initiators 105 utilize virtual addressing to access the memory subsystem 110, and thus each of the hardware initiators 105 operates independent of the physical arrangement of memory array 120. The virtual addressing re-maps areas of a visual image into memory array 120 to take advantage of the characteristics of a particular context, while still maintaining a pixel format and organization compatible with each hardware initiator. Because the memory storage arrangement is independent of the particular hardware initiators 105, system designers may chose between hardware initiators from different vendors without regard to the interoperability between hardware initiators 105 and memory array 120, or between the individual hardware initiators 105.

Continuing to refer to FIG. 1A, address decoder 125 is operatively coupled between hardware initiators 105 and address transformation logic 130. Upon receipt of virtual address requests from one of the hardware initiators 105, address decoder 125 determines whether the virtual address refers directly to the memory array 120 or whether the virtual address requires address transformation or mapping. In the preferred embodiment, the most significant bit (MSB) of the base address, sometimes called the "space qualifier bit", indicates whether the virtual address from one of the hardware initiators 105 should be transformed. If the space qualifier bit indicates that the virtual address refers directly to memory array 120, then no transformation is performed by the address transformation logic 130. If the space qualifier bit indicates that address transformation should be performed, then address transformation logic 130 uses at least some of the upper address bits of the virtual address to map the virtual address to a physical address within the memory array 120.

Figure 1B:
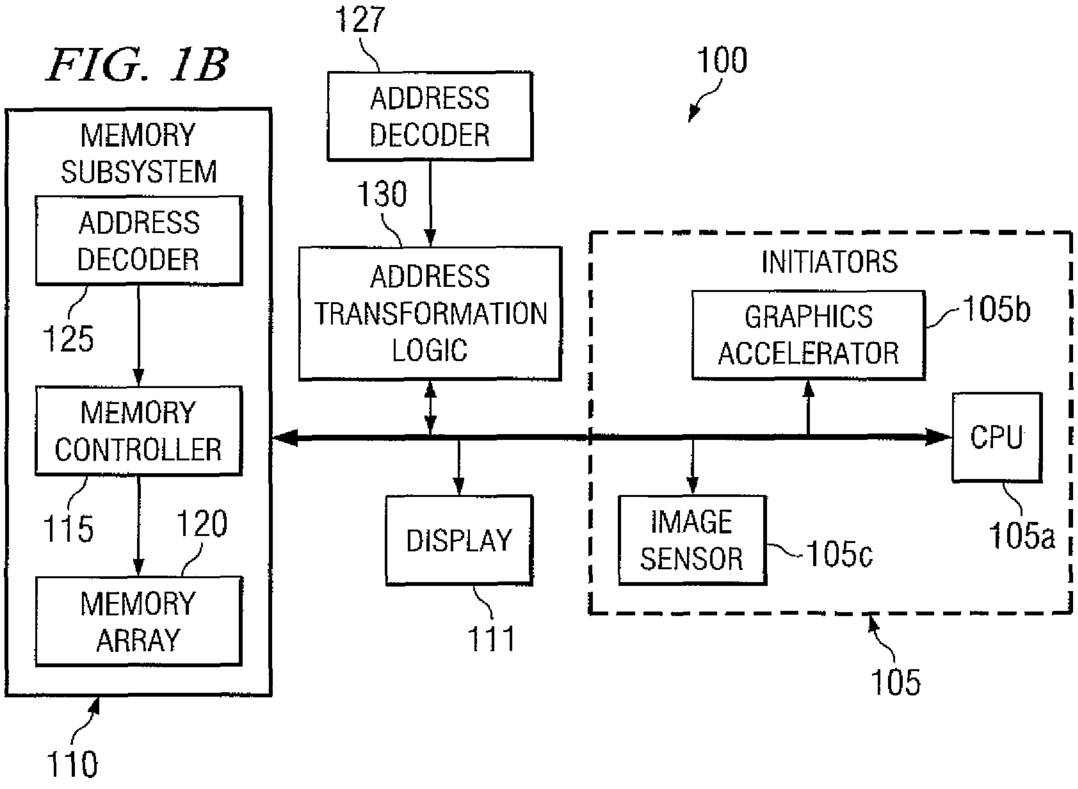
FIG. 1B depicts a computing system with address transformation logic external to the memory subsystem and coupled in parallel with the hardware initiators, capable of processing images and video in accordance with at least some preferred embodiments.

It should be noted that although the address transformation logic 130 of the preferred embodiment of FIG. 1A is shown within memory controller 115, in other preferred embodiments address transformation logic 130 may be external to memory controller 115, as shown FIGS. 1B and 1C. In the preferred embodiment of FIG. 1B, address transformation logic 130 couples to the hardware initiators 105, the memory control 115, and address decoder 127. As with address decoder 125 of FIG. 1A, address decoders 125 and 127 of FIG. 1B monitor the space qualifier bit to determine whether address transformation logic 130 performs the mapping functions described in the present disclosure, or whether the address provided by the hardware initiators is used directly by memory controller 115. The address transformation logic 130 of the preferred embodiment of FIG. 1C operates in a similar fashion, but is instead interposed in between memory controller 115 and the interconnect coupled to hardware initiators 105. Other configurations of address transformation logic 130 will become apparent to those skilled in the art (e.g., integrating the address transformation logic into the interconnect that couples hardware initiators 105 to memory subsystem 110, and all such configurations are intended to be within the scope of the present disclosure.

The mapping between the virtual address and the physical address is variable and depends upon which of a plurality of contexts within the memory controller is utilized. Each context refers to a different memory mapping function, and each performs a different address transformation. For example, assume that the memory array 120 is 64 MB and the user desires to use 16 MB for a first image from CPU 105*a* with 1 byte per pixel and the user also desires to use 16 MB for a second image from the image sensor with 2 bytes per pixel, where the first and second image resolutions are different. In this example, the user may define two different contexts within address transformation logic 130, wherein each image is virtually addressed by its respective hardware initiator using two different base addresses and different tile configuration settings.

As will be appreciated by one of ordinary skill in the art, because address transformation logic 130 of the preferred embodiments of FIGS. 1A, 1B and 1C is functionally interposed between the hardware initiators 105 and the memory array 120, the virtual-to-physical address transformation is common to all of the hardware initiators 105 within system 100. As a result, individual components within system 100 may transfer graphical data to and from memory subsystem 110, independent of the internal organization of memory array 120. Address transformation logic 130 effectively provides a "compatibility layer" that decouples the components within system 100 (both hardware and software) from the data ordering maintained within memory array 120, permitting the components within system 100 to interact with memory subsystem 110 without modification, and facilitating a faster time-to-market of a system such as the preferred embodiment described.

Figure 2B:
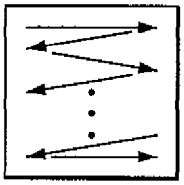
FIG. 2B depicts a scanning sequence within an image tile, in accordance with at least some preferred embodiments.

FIG. 2A depicts an exemplary virtual address 200 of pixel data generated by one of the hardware initiators 105. Referring to both FIGS. 1A and 2A, the virtual address 200 is transformed by address transformation logic 130 into a physical address that represents the address of the data within memory array 120. Virtual address 200 includes vertical and horizontal positions 205 and 210 respectively (representing the vertical and horizontal positions of the origin of the tile accessed), each of which is offset with respect to physical base address 255 of image 250. X-offset 220 and Y-offset 215 are also included within virtual address 200, and represent the X and Y pixel offsets relative to the tile origin (e.g., tile position 260). The maximum value of each offset represents the corresponding size of the tile. Thus, for example, if X-offset 220 is a 4-bit field and Y-offset 215 is a 3-bit field, the resulting tile size is 16 pixels in the horizontal direction ($2^4$) by 8 pixels in the vertical direction ($2^3$). Similarly, the maximum number of tiles in each direction is governed by the number of bits allocated to vertical position field 205 and horizontal position field 210.

Under the pixel addressing scheme described above, pixels are sequentially addressed within the virtual memory address space in the same order as they are displayed on display 111. Thus, each of the hardware initiators 105 accesses memory subsystem 110 as if the pixels of image 250 are directly mapped, one-for-one, to sequential locations within the virtual memory address space, regardless of the actual location of the pixel data within memory array 120 of FIG. 1A. By defining bit fields within the virtual address as described above, it is possible to perform a transformation that maps the pixel information of an image to non-sequential locations (e.g., mapping a single tile spanning multiple scan rows into a single row within memory array 120). This is accomplished while still retaining the apparent sequential pixel mapping visible to hardware initiators 105. Although the embodiments described utilize a sequential one-to-one virtual-address-to-pixel-location configuration (as exposed to hardware initiators 105), other configurations will become apparent to those skilled in the art and all such configurations are intended to be within the scope of the present disclosure.

To perform the aforementioned transformation, pixel information for each tile is stored within a single memory row by combining the base address, horizontal and vertical tile positions, and horizontal and vertical pixel offsets within a tile to generate a physical address within memory array 120. In at least some illustrative embodiments, this transformation is represented mathematically by equation 1:

$$PA=PA_{Base}+(P_{Vert}*2^{(Y+N)})*W+(P_{Horiz}*2^{(X+Y+N)})+(Y_{Offset}*2^{(X+N)})+(X_{Offset}*2^{(N)}) \quad (1)$$

wherein PA is the resulting physical address, $PA_{Base}$ is the physical base address of the image; $P_{Vert}$ is the vertical position of the tile addressed (referenced to the image origin at the top, left-hand corner of the image and increasing in value from top to bottom); $P_{Horiz}$ is the horizontal position of the tile addressed (referenced to the image origin and increasing from left to right); $Y_{Offset}$ is the vertical offset of the pixel addressed within the tile (referenced to the tile origin at the top, left-hand corner of the tile and increasing in value from top to bottom); $X_{Offset}$ is the horizontal offset of the pixel addressed within the tile (referenced to the tile origin and increasing in value from left to right); Y is the number of bits allocated to Y-Offset field 215; W is the number of pixels per scan line of a mapped image; X is the number of bits allocated to X-Offset field 220; and N is one less than the number of bits allocated per pixel.

By using a transformation such as the one in equation (1), each tile is mapped into a single memory row within memory array 120. Each increment in either vertical position 205 or horizontal position 210 causes a new physical memory row to be addressed, while any change in value for either Y-Offset 215 or X-Offset 220 results in the same single row being accessed for a given value of vertical position 205 and horizontal position 210. FIG. 28 illustrates how data from within a single tile is distributed and accessed. In the at least some preferred embodiments that implement equation (1), the stride distance of the picture (the number of pixels between the start of each scan line) is set to a fixed value of 2048, which is the scan-line width of the mapped image visible to the hardware initiators 105 of FIGS. 1A, 1B and 1C. By using fixed line width dimensions that are powers of two, the transformations are simplified and can be performed much more rapidly and efficiently. Also, if the mapped image is less than the next lowest power of two from the stride distance (e.g., 640 pixels, which is less than 1024), the mapping function can be adjusted to not map the unused pixels at and above this next lowest power of two (i.e., 1024 in the example described), thus increasing the efficiency of the use of the physical memory. Similar gains in performance and efficiency may also be achieved by selecting a total number of tiles in each of the X and Y directions that are also powers of two.

Figure 3:
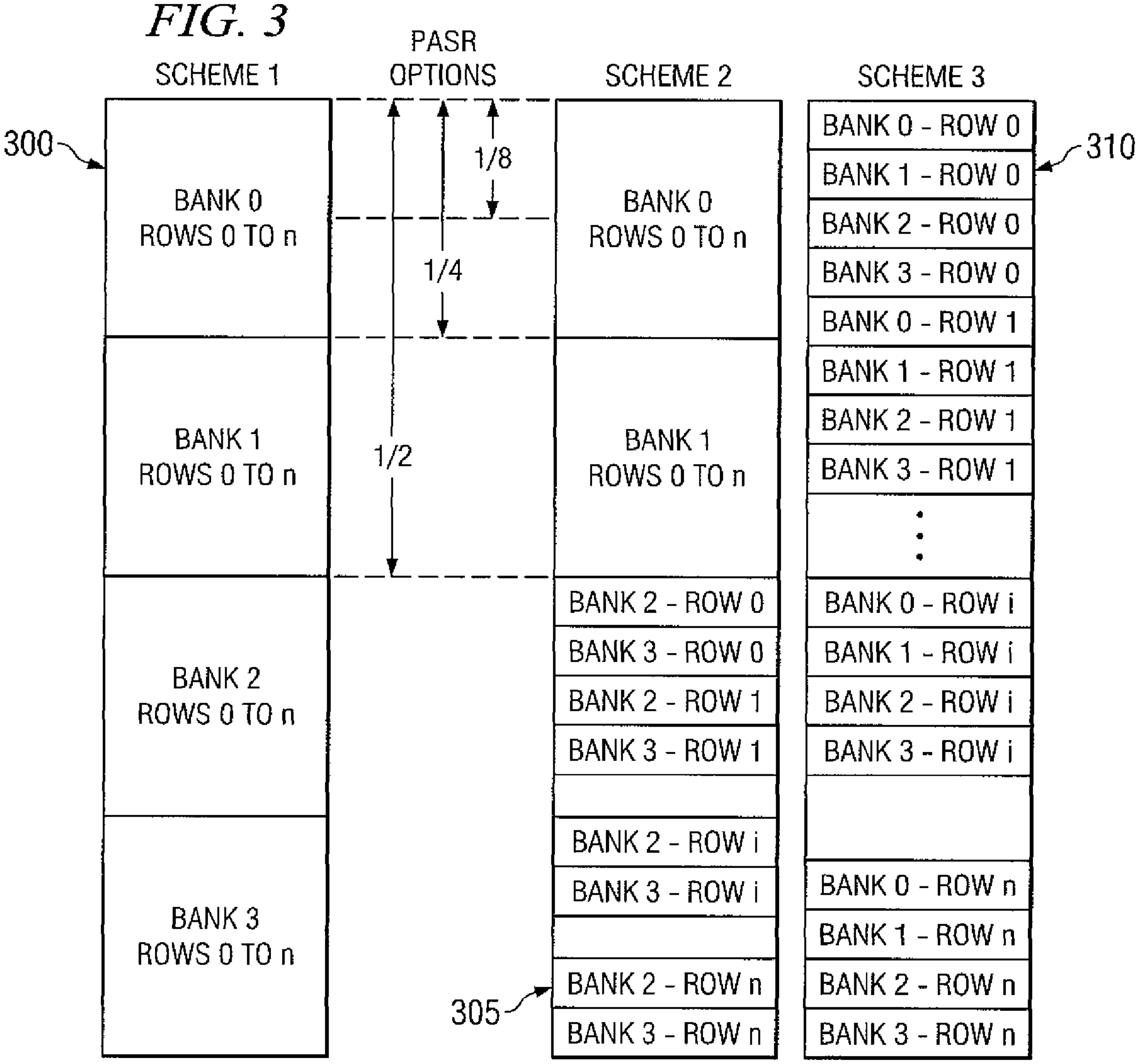
FIG. 3 depicts memory arrays, in accordance with at least some preferred embodiments.

In addition to storing graphical data in a tiled fashion, the preferred embodiment described also implements bank interleaving of memory array 120. FIG. 3 depicts exemplary memory arrays 300, 305, and 310. A non-interleaved memory array 300 is shown, wherein the memory array 300 comprises banks 0-3 and each bank further comprises rows 0-N. As would be familiar to one of ordinary skill in the art, the non-interleaved array 300 only allows a single row within any given bank to be accessed at a time. Thus, a first row within bank 0 must be closed before a second row within bank 0 may be accessed, and this row opening and closing adds to the overall memory access time. Additionally, a two dimensional object usually spans across multiple tiles (each of which are stored in separate rows as discussed above). Therefore, accessing graphical data that is tiled and stored in the non-interleaved array 300 will generate successive delays in closing the first row containing data for a first tile and opening a second row containing data for a subsequent tile. As a result, the encoding and decoding of multi-dimensional objects spanning multiple tiles will suffer memory access time penalties in the non-interleaved array 300.

The partially-interleaved memory array 305 of FIG. 3 includes the same number of banks and rows as the non-interleaved array 300. However, banks 2 and 3 are interleaved such that memory accesses to sequential tiles occur in rows of different banks, as tiles are alternately mapped in banks 2 and 3. As a result, sequential tiles (which occupy an entire row) may be opened without waiting for a previous row to close first. Effectively, the partial-interleaved memory array 305 allows accesses to multiple tiles sequentially without waiting for rows to open and/or close.

A fully-interleaved memory array 310 comprises the same number of banks and rows as the non-interleaved array 300, however, banks 0-3 are interleaved such that sequential tile accesses occur in rows of different banks and tiles are mapped across all four banks. This reduces the latency associated with waiting for banks to close even further, as compared to partially-interleaved memory array 305.

In at least some preferred embodiments, partial array self-refresh (PASR) is employed, wherein memory banks that include rows that have not been accessed within the required refresh interval are automatically refreshed internally by circuitry within or coupled to memory array 120. Because the refresh is performed as needed on a bank-by-bank basis, the amount of power consumed during the refresh process may be reduced as compared to refreshing the entire array (also referred to as total array self-refresh or TASR). Such a partial refresh capability may be particularly useful in battery-powered handheld electronic devises where power consumption is a chief concern. PASR is preferably used with partially-interleaved array 305, since refreshes of fully-interleaved array 310 require a refresh of all of the banks, given the deliberate distribution of tile data across all banks. Thus, if a self-refresh is required, a total array self-refresh has to be executed across all banks within fully-interleaved array 310. A partial refresh of only some banks could cause the data in the remaining banks (not refreshed within the required refresh interval) to become corrupted.

Tiling memory contexts in the non-interleaved array 300 can result in significant performance improvements and power consumption reductions during memory accesses over non-tiled memory contexts. In addition to tiling the memory contexts, some embodiments may implement other features to improve memory accesses. Referring again to FIG. 1A, in at least some preferred embodiments the hardware initiators 105 may group memory accesses if there is a relationship among one or more address requests. For example, if one of the hardware initiators 105 detects that memory requests are to the same tile, then that hardware initiator may group the memory requests together so that the memory accesses are sent by the address decoder 125 to the memory array 120 as a single group of memory requests. This technique of sending grouped requests is sometimes referred to as "bursting". Combining bursting with a tiled memory arrangement conserves the memory overhead involved in arbitrating memory access requests. Such arbitration may be required due to bus and/or network congestion that results from the competition between initiators contemporaneously attempting to access memory array 120. The use of tiling memory contexts in the non-interleaved array 300 in conjunction with bursting may thus result in additional performance improvements and power consumption reductions over tiling the memory contexts alone.

The above discussion is meant to be illustrative of the principles and various embodiments of the present invention. Numerous variations and modifications will become apparent to those skilled in the art once the above disclosure is fully appreciated. For example, although hardware initiators are discussed herein, other embodiments may employ one or more software initiators that interact with memory subsystem 110 in the same manner as hardware initiators 105. Further, the embodiments disclosed may be useful in memory devices and configurations where the sequence of memory address accesses may impact the overall performance of memory subsystem 110 (e.g., DRAM, flash memory, synchronous DRAM (SDRAM), mobile DRAM, and/or magnetic RAM). Also, although the embodiments described illustrate the mapping of pixel data, other 2D and 3D graphical data associated with a graphical object may also be mapped as described, such as Z-Buffer data, light rendering data, mask stencil data, and pre-computed light map data, just to name a few examples. It is intended that the following claims be interpreted to embrace all such variations and modifications.

What is claimed is:

1. A method for accessing data, comprising:

partitioning a display of graphical data into a plurality of two-dimensional tiles;

mapping a two-dimensional tile of the plurality of two-dimensional tiles to a single memory row within a memory; and maintaining the graphical data for the two-dimensional tile in the single memory row, wherein the mapping of the two-dimensional tile comprises transforming a virtual memory address to a physical memory address and the transforming of the virtual memory address comprises calculating the physical memory address according to the equation, $$PA = PA_{Base} + (P_{vert} * 2^{(Y+N)} * W + (P_{Horiz} * 2^{(X+Y+N)}) + (Y_{Offset} * 2^{(X+N)}) + (X_{Offset} * 2^{(N)})$$

wherein PA is the physical memory address, $PA_{Base}$ is a physical base address of the graphical data; $P_{vert}$ is a vertical position of the two-dimensional tile relative to $PA_{Base}$; $P_{Horiz}$ is a horizontal position of the two-dimensional tile relative to $PA_{Base}$; $Y_{offset}$ is a vertical pixel offset within the two-dimensional tile relative to $P_{vert}$; $X_{Offset}$ is a horizontal pixel offset within the two-dimensional tile relative to $P_{Horiz}$; Y is a first number of virtual address bits used to represent $Y_{Offset}$; W is the number of pixels per scan line of a mapped image; X is a third number of virtual address bits used to represent $X_{offset}$; and N is one less than a number of bits used to represent each pixel of the pixel data.

2. The method of claim 1, wherein the graphical data comprises data selected from the group consisting of still image pixel data, video pixel data, light rendering data, z-buffer data, pre-computed light map data, and mask stencil data.

3. The method of claim 1, wherein the graphical data comprises one or more graphical objects, and wherein horizontal and vertical dimensions of the two-dimensional tile are based upon the dimensions of the one or more graphical objects.

4. The method of claim 1, wherein horizontal and vertical dimensions of the two-dimensional tile are based upon at least one parameter selected from the group of parameters consisting of a size of the single memory row, a type of the graphical data stored in the memory, and a scan-line width of a mapped image.

5. The method of claim 1, wherein the graphical data comprises one or more graphical objects, and wherein horizontal and vertical dimensions of the two-dimensional tile are based upon a frequency with which the one or more graphical objects are accessed.

6. A computer system, comprising a memory array that stores graphical data;

address transformation logic coupled to the memory array, the address transformation logic capable of performing a memory address transformation to transform a virtual memory address to a physical memory address; and at least one initiator that accesses the graphical data, the at least one initiator coupled to the address transformation logic;

wherein the address transformation logic is configured to organize the graphical data into a two-dimensional array of tiles, when the memory address transformation is enabled, each tile of the two-dimensional array of tiles representing a two-dimensional displayed region of the graphical data;

wherein data for each tile is stored within no more than one row of the memory array, when the memory address transformation is enabled; and wherein when the memory address transformation is enabled, the transforming of the virtual memory address comprises calculating the physical memory address according to the equation, $$PA = PA_{Base} + (P_{vert} * 2^{(Y+N)} * W + (P_{Horiz} * 2^{(X+Y+N)}) + (Y_{Offset} * 2^{(X+N)}) + (X_{Offset} * 2^{(N)})$$

wherein PA is the physical memory address $PA_{Base}$ is a physical base address of the graphical data; $P_{vert}$ is a vertical position of the two-dimensional tile relative to $PA_{Base}$; $P_{Horiz}$ is a horizontal position of the two-dimensional tile relative to $PA_{Base}$; $Y_{offset}$ is a vertical pixel offset within the two-dimensional tile relative to $P_{vert}$; $X_{Offset}$ is a horizontal pixel offset within the two-dimensional tile relative to $P_{Horiz}$; Y is a first number of virtual address bits used to represent $Y_{offset}$; W is the number of pixels per scan line of a mapped image; X is a third number of virtual address bits used to represent $X_{offset}$; and N is one less than a number of bits used to represent each pixel of the pixel data.

7. The computer system of claim 6, further comprising an address decoder that enables the memory address transformation if a qualifier bit within the address presented to the address transformation logic by the at least one initiator is asserted.

8. The computer system of claim 6, wherein the graphical data comprises data selected from the group consisting of still image pixel data, video pixel data, light rendering data, z-buffer data, pre-computed light map data, and mask stencil data.

9. The computer system of claim 6, wherein the memory array is divided into a plurality of banks, a first bank of the plurality of banks comprising data representing a first tile of the two-dimensional array of tiles, a second bank of the plurality of banks comprising data representing a second tile of the two dimensional array of tiles, and the first and second tiles visually adjacent to, and sharing a boundary with, each other; and wherein the second tile within the second bank is accessed without terminating a prior initiated access to the first tile within the first bank.

10. The computer system of claim 9, wherein the plurality of banks is configured for interleaved access.

11. The computer system of claim 9, wherein the memory array comprises dynamic random access memory, and wherein the array is refreshed using a partial array self-refresh mechanism.

12. The computer system of claim 6, wherein the at least one initiator re-orders a plurality of accesses to the memory array and bursts the re-ordered plurality of accesses as a group to the address transformation logic; and wherein the plurality of accesses each comprises an access to data within a same tile.

13. A memory controller, comprising:

address transformation logic, capable of mapping a received virtual address into a physical address of a memory device coupled to the memory controller;

wherein the address transformation logic is configured to map virtual addresses of graphical data within a two-dimensional tile into a physical address within a row of the memory device;

wherein all addresses of the graphical data within the two-dimensional tile map to a range of physical addresses within a same row of the memory device; and wherein the address transformation logic maps the received virtual address to the physical address according to the equation, $$PA=PA_{Base}+(P_{Vert}*2^{(Y+N)})*W+(P_{Horiz}*2^{(X+Y+N)})+(Y_{Offset}*2^{(X+N)})+(X_{Offset}*2^{(N)})$$

wherein PA is the physical address, $PA_{Base}$ is a physical base address of the graphical data; $P_{vert}$ is a position of the two-dimensional tile relative to $PA_{Base}$; $P_{Horiz}$ is a horizontal position of the two-dimensional tile relative to $PA_{Base}$; $Y_{Offset}$ is a vertical pixel offset within the two-dimensional tile relative to $P_{vert}$; $X_{offset}$ is a horizontal pixel offset within the two-dimensional tile relative to $P_{Horiz}$; Y is a first number of virtual address bits used to represent $Y_{Offset}$; W is the number of pixels per scan line of a mapped image; X is a third number of virtual address bits used to represent $X_{Offset}$; and N is one less than a number of bits allocated to represent each pixel of the graphical data.

14. The memory controller of claim 13, wherein the graphical data comprises data selected from the group consisting of still image pixel data, video pixel data, light rendering data, z-buffer data, pre-computed light map data, and mask stencil data.

15. The memory controller of claim 13, wherein the graphical data comprises one or more graphical objects, and wherein horizontal and vertical dimensions of the two-dimensional tile are based upon the dimensions of the one or more graphical objects.

16. The memory controller of claim 13, wherein horizontal and vertical dimensions of the two-dimensional tile are based upon at least one parameter selected from the group of parameters consisting of a storage capacity of the row of the memory device, a type of the graphical data stored in the memory, and a width of a mapped image.

17. The memory controller of claim 13, wherein the graphical data comprises one or more graphical objects, and wherein horizontal and vertical dimensions of the two-dimensional tile are based upon a frequency with which the one or more graphical objects are accessed.

* * * * *